C. MILLER.
TIME COMBINATION LOCK.
APPLICATION FILED MAY 31, 1919.

1,384,397.

Patented July 12, 1921.
5 SHEETS—SHEET 1.

INVENTOR
Charles Miller
BY
D. Anthony Morris
ATTORNEY

C. MILLER.
TIME COMBINATION LOCK.
APPLICATION FILED MAY 31, 1919.

1,384,397.

Patented July 12, 1921.
5 SHEETS—SHEET 2.

INVENTOR
Charles Miller
BY
D. Anthony Usina
ATTORNEY

C. MILLER.
TIME COMBINATION LOCK.
APPLICATION FILED MAY 31, 1919.

1,384,397. Patented July 12, 1921.
5 SHEETS—SHEET 3.

INVENTOR
Charles Miller
BY
D. Anthony Usina
ATTORNEY

C. MILLER.
TIME COMBINATION LOCK.
APPLICATION FILED MAY 31, 1919.

1,384,397.

Patented July 12, 1921.
5 SHEETS—SHEET 5.

INVENTOR
BY Charles Miller
D. Anthony Morris
ATTORNEY

UNITED STATES PATENT OFFICE.

CHARLES MILLER, OF NEW YORK, N. Y.

TIME COMBINATION-LOCK.

1,384,397.  Specification of Letters Patent.  Patented July 12, 1921.

Application filed May 31, 1919. Serial No. 300,966.

*To all whom it may concern:*

Be it known that I, CHARLES MILLER, a citizen of the United States, residing in the city, county, and State of New York, have invented certain new and useful Improvements in Time Combination-Locks, of which the following is a specification.

This invention relates to combination time locks in which the withdrawal of the bolt can only be effected after the lapse of one or more periods of time known to the operator, after he starts to work the combination. My improved lock differs from the usual time lock in that it does not necessarily employ a clock for continuously driving the controlling mechanism. The lock contains one or more time wheels for normally preventing the withdrawal of the bolt and one or more simple escapement mechanisms with suitable spring motors for driving them, and controlling means whereby the escapement mechanism may be permitted to run for varying intervals.

One of the objects of the invention is to provide a lock in which the withdrawal of the bolt is normally prevented by means which can only be manipulated by the working of a combination controlled by time intervals. Another object of the invention is to provide a time lock so constructed that it is not necessary to provide it with a clock movement. A further object is to provide one or more simple escapement mechanisms within the lock which will normally prevent the withdrawal of the bolt and which may be manipulated by an operator so as to permit the withdrawal of said bolt. Another object is to provide means whereby the combination of time intervals necessary to work the lock may be changed by a person holding the combination. Another object is to combine and coördinate the various instrumentalities herein described to effectively perform their various functions. Other objects will be apparent from the following description and claims when read with the accompanying drawings in which similar reference characters refer to similar parts in the several views.

Figures 1, 2, 24:
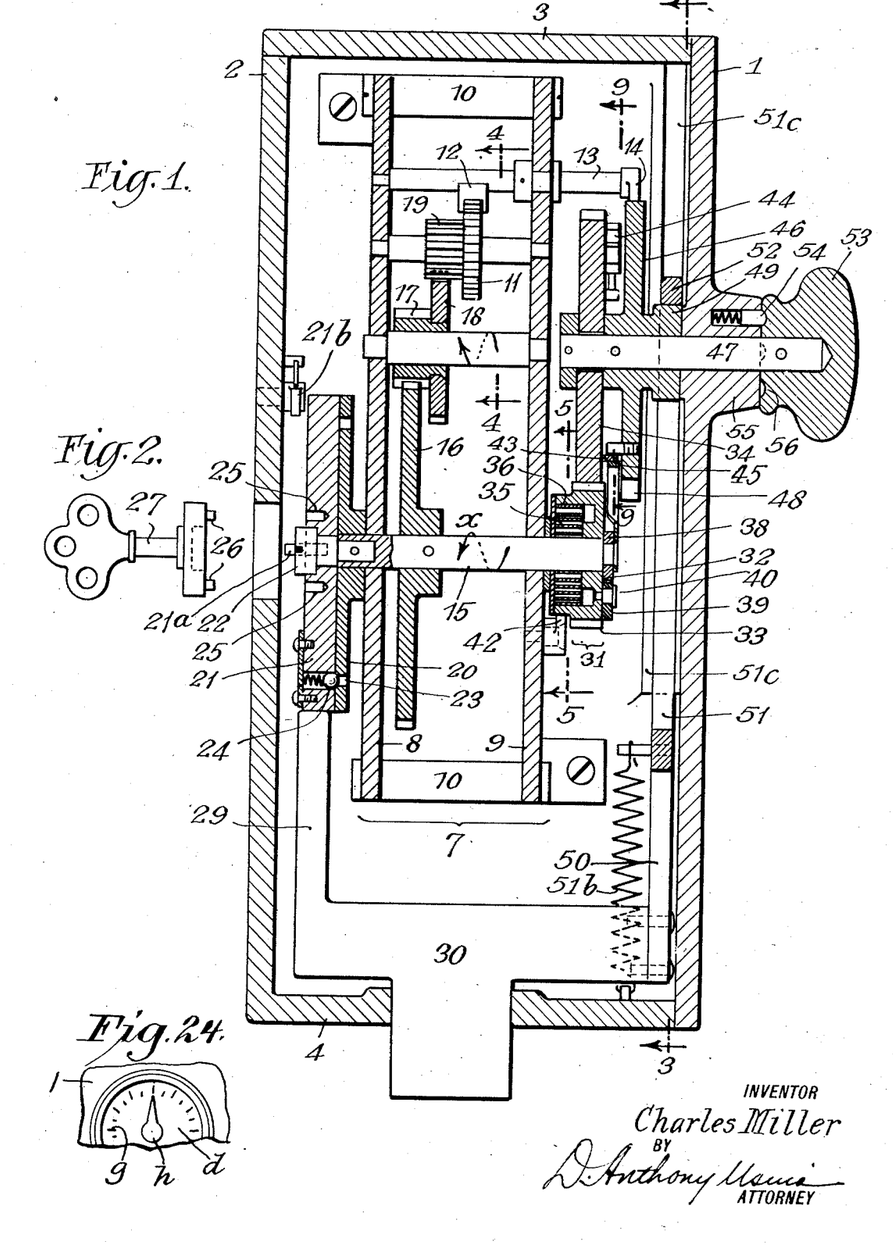
Figure 1 is a vertical section through a lock embodying the more primitive form of my invention.
Fig. 2 is a detail of a key for changing the combination.
Figs. 23 and 24 are detail views illustrating a modification in which a luminous hand is provided to give a visual indication to assist in working the combination.

Referring first to the more primitive embodiment of the invention as illustrated in Figs. 1 to 9 inclusive, the lock is inclosed by a casing comprising front and rear walls 1 and 2, top and bottom walls 3 and 4 and side walls 5 and 6. A skeleton frame 7 consisting of side plates 8 and 9 joined by suitable spacers 10 is secured to the side walls 5 and 6 of the casing. The skeleton frame 7 supports a simple escapement mechanism consisting of an escape wheel 11 and pallet 12 which is carried by an arbor 13 having a finger 14 fixed to one end thereof. The escape wheel 11 is driven by the spring motor shaft 15 through gears 16, 17, 18 and 19 as shown in Fig. 1. A time wheel 20 is fixedly secured to one end of the spring motor shaft 15 and a slotted tumbler disk 21 is mounted on a shouldered stud 22 secured in the end of the shaft 15, said tumbler disk 21 being loose on the stud and arranged to be moved relatively to the time wheel 20. The time wheel 20 is formed with a plurality of circularly arranged holes 23 for coöperation with a spring pressed impositive locking ball 24 carried by the tumbler disk. The impositive locking connecting between the tumbler disk and the time wheels permits of an adjustment between the two whereby the combination of the lock may be varied as will be hereinafter described.

The tumbler disk is provided with key holes 25 adapted to coöperate with the prongs 26 on a suitable key 27, illustrated in Fig. 2. A pin $21^a$ is secured in one face of said tumbler disk and is adapted to coöperate with a yielding stop pawl $21^b$, shown in dotted lines in Fig. 6. These members enable the operator to move the tumbler disk to a starting position prior to changing the combination. A radial slot 28 (Figs. 3 and 6) is formed in the tumbler disk 21 to permit the finger 29 to enter therein when the bolt 30 is moved to unlocked position after the correct combination has been worked.

Figures 3, 4, 5:
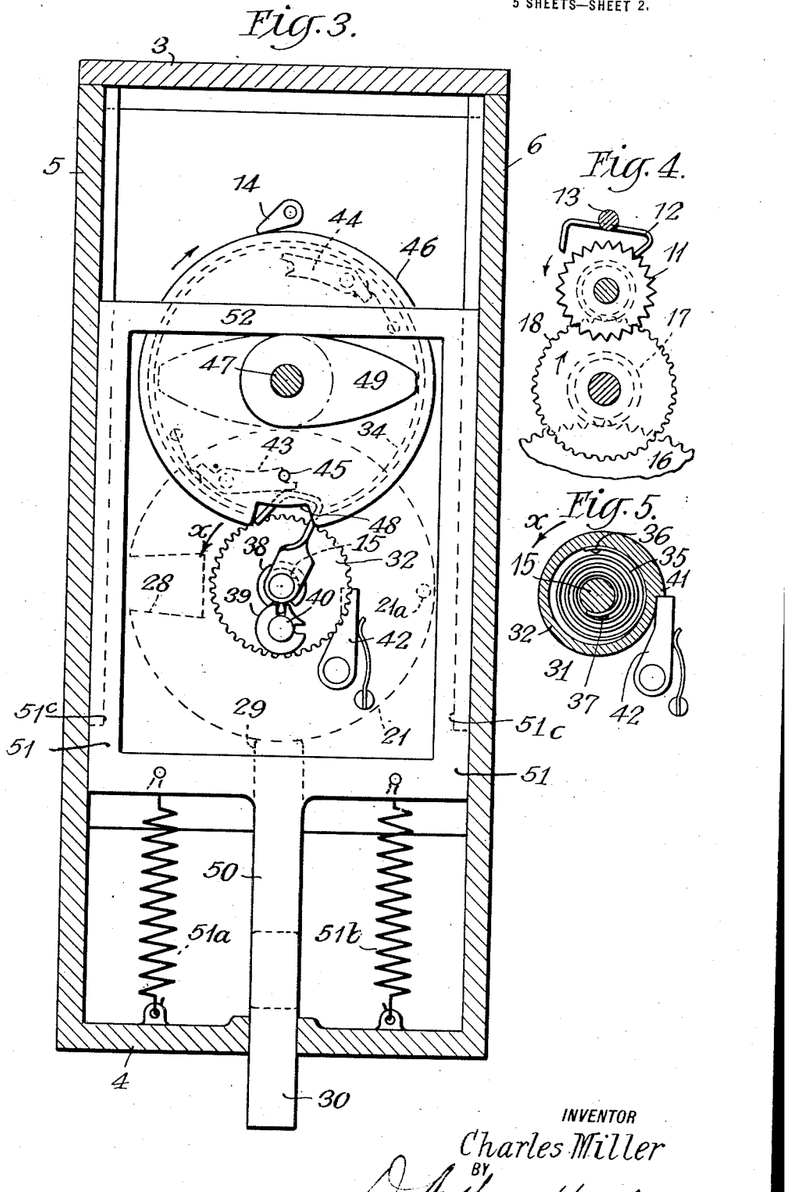
Fig. 3 is a vertical section on the line 3—3 of Fig. 1.
Figs. 4 and 5 are detail views taken respectively on the lines 4—4 and 5—5 of Fig. 1.

The time wheel is driven from the normally run down spring motor 31 which is arranged to be wound up each time the combination is worked. This motor comprises a hollow drum 32 loosely mounted on the shaft 15 and provided with gear teeth 33 for coöperating with a winding gear 34. One end of a volute spring 35 is secured at 36 to the inner wall of the drum, as shown in Figs. 1 and 5. And the other end of this spring is secured at 37 to the shaft 15. A one tooth disk 38 is fixedly secured to the end of the shaft 15 for coöperation with a Geneva stop disk 39 pivoted on a stud 40 secured to the front face of the drum 32.

The disk 38 and the Geneva stop 39 are so formed and proportioned that the drum can only be wound for one complete revolution and the shaft 15 can only make one complete revolution as a result of one winding of the drum. The drum 32 is provided with a tooth 41 which coöperates with a spring pressed pawl 42 to prevent a backward movement of the drum after it has been wound for one complete revolution. The drum is wound by the winding gear 34 above referred to, which is provided with two oppositely arranged spring pressed winding pawls 43 and 44 adapted to be rocked on their pivots by a yielding finger $45^a$ secured to the shaft 15 to move said pawls into position to co-act with a pin 45 carried by a controller disk 46 fixedly secured on a controller shaft 47. The peripheral edge of the controller disk 46 co-acts with the finger 14 to normally prevent the escapement mechanism from running and this disk is provided at 48 with a notch which when brought into proper position will permit the finger 14 to enter therein and thus allow the escapement mechanism to run. A bolt actuating member consisting of a cam 49 is arranged to be moved in unison with the controller disk 46.

In the embodiment illustrated this cam is shown as being an integral part of the controller disk. The downwardly extending leg 50 of a yoke 51 is secured to the bolt 30 and the top horizontal cross-member 52 thereof bears against the face of the bolt operating cam 49, the springs $51^a$ and $51^b$ acting to keep the said cross-bar in engagement therewith, said yoke being guided in ways $51^c$. The controller disk 46 can be turned by means of a knob 53 secured to the shaft 47 or in some instances a key might be substituted in place of this knob. A spring pressed plunger 54 is mounted in a hub 55 formed on the casing and coöperates with spherical indentations 56 formed in one face of the knob 53 to enable an operator to use the sense of touch when working the combination.

Figure 10:
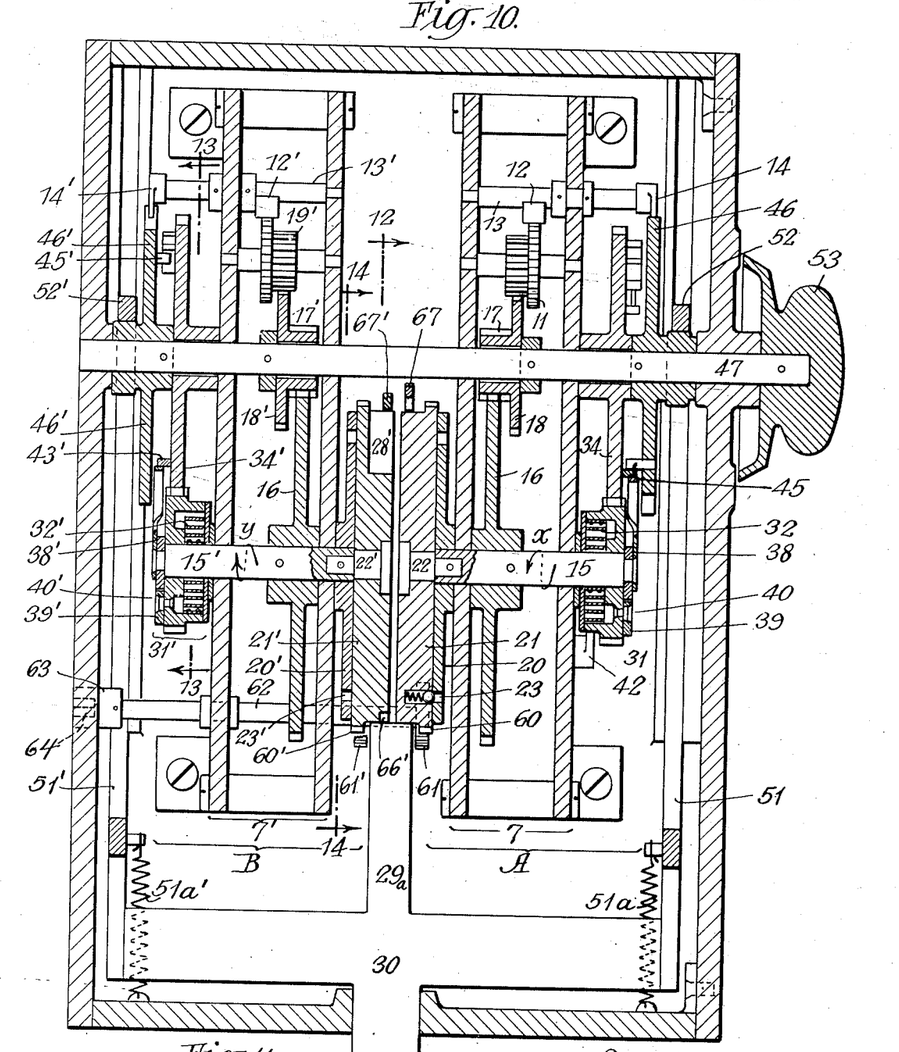
Fig. 10 is a vertical section similar to Fig. 1, showing a lock in which a plurality of time intervals must lapse in working the combination in order to effect the withdrawal of the bolt.

The device as thus far described applies to a lock, the bolt of which can be withdrawn after the lapse of one period of time, known to the operator. The embodiment illustrated in Figs. 10 to 22 inclusive discloses a lock in which it is necessary for the operator to be in possession of a combination including a plurality of time intervals before he can properly manipulate the controlling means of the lock to effect the withdrawal of the bolt. The lock disclosed in these figures employs two sets of escapement mechanisms similar in construction to that already described in reference to Figs. 1 to 10. These parts are practically identical in construction and it is therefore not thought necessary to specifically describe them, except in so far as they differ in detail. The escapement mechanism 7 for the unit A, shown at the right in Fig. 10, is designed to operate in the same direction as that illustrated in Fig. 1, as indicated by the arrow $x$; while the escapement mechanism 7' for the unit B, illustrated at the left in Fig. 10, is designed to operate in the opposite direction, indicated by the arrow $y$. For the purposes of identification, the elements shown at the right in Fig. 10 which are similar to those described with reference to Figs. 1 to 9, will bear corresponding reference characters, while the corresponding elements shown at the left of this figure will bear similar reference characters with a prime exponent applied thereto.

Figures 11, 12:
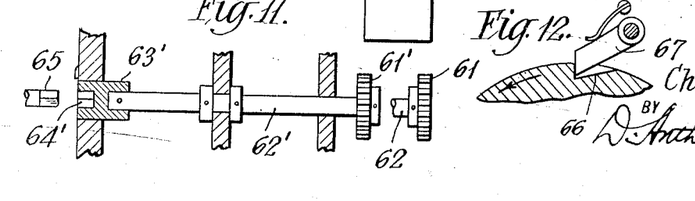
Fig. 11 is a detail of parts shown in Fig. 10 for changing the combination.
Fig. 12 is a fragmentary detail taken on the plane indicated on the line 12—12 of Fig. 10.

The chief differences in construction between the lock shown in Fig. 1 and that shown in Fig. 10 are in the means for moving the tumbler disks relatively to the time wheels for changing the combination and to the means for indexing the movement of the knob 53. The tumbler disks 21 and 21' differ from the tumbler disk previously described in that they are each provided with gear teeth 60 and 60' which mesh with pinions 61 and 61' carried on short shafts 62 and 62' the ends of these shafts being provided with collars 63 and 63' provided with apertures 64 and 64' to receive a key 65 as shown in Figs. 10 and 11.

The notches 28 and 28' in the tumbler disks 21 and 21' in this case are only cut part way into the face of these disks, as indicated at 28' in Fig. 10. At one point in each disk, preferably diametrically opposite the notches 28 and 28', indentations 66 and 66' are formed to coöperate with the spring pressed pawls 67 and 67' for stopping the tumbler disks in a predetermined starting position to enable the operator to accurately re-set the combination. The notches 66 and 66' and pawls 67 and 67' coöperate to perform the same function as the pin $21^a$ and the yielding stop $21^b$ described in reference to Fig. 1.

The operation of the lock shown in Figs. 1 to 9 inclusive will first be described. The time wheel 20 is normally in such position that the tumbler disk 21 carried thereby prevents the upward movement of the finger 29 which contacts therewith and the bolt 30 can only be withdrawn at such times when the slot 28 is brought to register with this finger. In order to bring about this condition it is necessary first to turn the knob 53 in a clockwise direction as viewed from the right in Fig. 1, and as shown in Fig. 3. This action will rotate the winding gear 34 through a half revolution by reason of the engagement between the pin 45 and the pawl 43. The ratio between the gear 34 and the drum 32, being as two is to one, the half turn of said gear will rotate the drum exactly one revolution, it being understood that during this movement the finger 14 and the pallet 12 prevents the escapement mechanism from operating. As soon as the full revolution of the drum has been effected the spring pawl 42, Fig. 5, will come into play to prevent a backward movement of the drum, and the Geneva stop members 38 and 39 will prevent the drum from being moved more than one complete revolution. This initial movement will bring the controller disk 46 into position, shown in Fig. 6, in which the slot 48 will come opposite the finger 14 which controls the movement of the pallet 12 of the escapement mechanism, therefore the shaft 15 of the spring motor will be permitted to turn in the direction of the arrow $x$. The operator with a watch or clock at hand will hold the knob in this position for a predetermined interval (fifteen seconds in the case illustrated).

The next action is to turn the knob in a counter-clockwise direction which will cause the controller disk 46 to interrupt the motion of the finger 14 thereby stopping the movement of the escapement mechanism, and the shaft 15 carrying the time wheel and the tumbler disk. If the controller disk has been held for the proper length of time the disk 21 will stop when its slot 28 comes in register with the finger 29 and will permit the parts to be turned further in a counter-clockwise direction until they reach the position shown in Fig. 7, in which the cam 49 has raised the yoke 51 to withdraw the bolt. This completes the unlocking operation.

Figure 8:
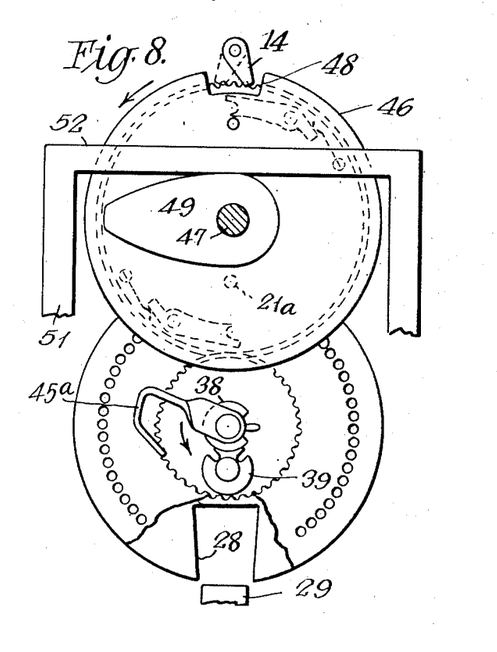
Figure 9:
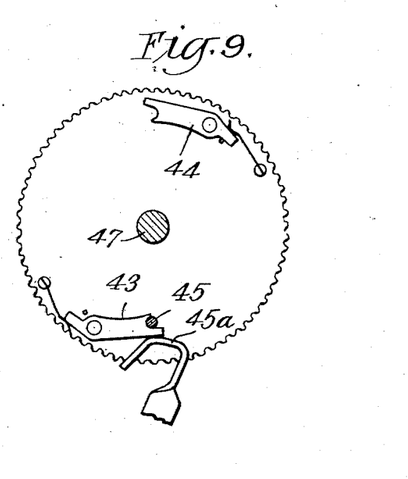
Fig. 9 is a detail view taken on the line 9—9 of Fig. 1.

To lock the bolt and restore the parts to normal operative position it is merely necessary to turn the knob a quarter turn in a counter-clockwise direction to the position shown in Fig. 8. This will swing the cam 49 around and permit the springs $51^a$ and $51^b$ to move the bolt to closed position and will also turn the notch 48 and the disk 46 to such a position to permit the finger 14 to vibrate. The knob is held in this position until the escapement stops clicking at which time the spring motor will have turned the shaft 15 through the balance of the revolution not used in bringing the time wheel to its unlocked position, thereby re-setting the time wheel to its original or starting position.

The spring motor and escapement mechanism are so designed and proportioned that the time wheel 20 will make exactly one revolution per minute. It is, therefore, possible to gage the time required to bring the time wheel into unlocking position if the angular distance between the finger 29 and the slot 28 in the tumbler disk is known. The holes 23 in the time wheel 20 are sixty in number, each space corresponding with one second of time. When the pin $21^a$ is in engagement with the yielding stop $21^b$ the slot in the tumbler disk will be in alinement with the finger 29 secured to the bolt, and the operator by first bringing the pin $21^a$ into engagement with the pawl $21^b$ by means of the key 27 can turn the tumbler disk 21 in the direction of the arrow in Fig. 6 and count the clicks made by the impositive lock 24. The number of clicks or spaces moved, subtracted from sixty, will equal the combination or number of seconds necessary to allow the escapement mechanism to run in order to bring the tumbler disk into position to throw the bolt.

Figure 6:
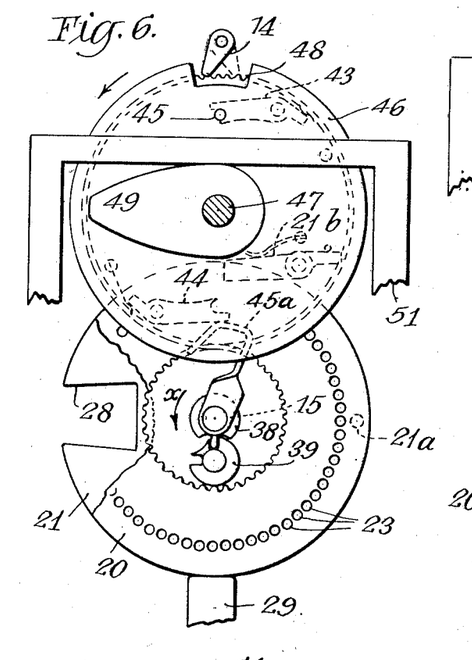
Figs. 6, 7, and 8 are fragmentary views illustrating different positions of the controller disk, time wheel and other associated elements; certain parts being omitted for clearness.
Figure 7:
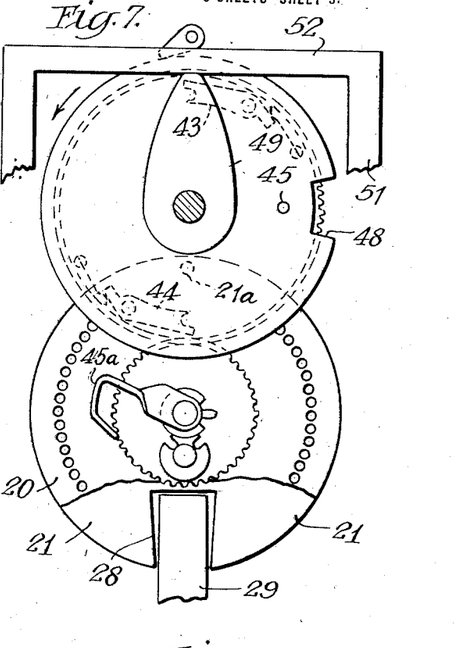

By reason of the yielding connections 43 and 44 between the controller disk 46 and the winding wheel 34, it will be seen that the movement in only one direction will effect the winding movement of the drum, it being clear that when the controller disk 46 is moved counter-clockwise, as viewed from the right in Fig. 1 and indicated in Figs. 6 to 8, no motion will be transmitted to the winding gear 34. The yielding pawls 43 and 44 act alternately. For example, during the operation described the driving engagement between the winding gear 34 and controller disk 46 was effected by the co-action of the pin 45 and the yielding pawl 43 and their engagement was operative for the first 180 degrees clockwise movement. This movement brought the pawl 44 from the position shown in Fig. 3 to that shown in Fig. 6, where it is rocked to position (by the finger 45$^a$) to be engaged by the pin 45 the next time the combination is to be worked. When the disk 46 is moved from the position shown in Fig. 6, to the starting position shown in Fig. 3, the finger 45$^a$ yields to permit the pin 45 to depress the pawl 44 so that it can come into the said starting position as shown.

From the foregoing it is clear that the bolt of this lock can only be withdrawn by one in possession of the time combination. If the lock is operated by meddlers or if the operator improperly manipulates the combination and cannot withdraw the bolt it is only necessary for the operator to turn the knob to such a position that he hears the escapement click and then permit it to run down. This will restore the parts to their initial or starting positions from which he may again work the combination for the proper period.

When it is desired to have a lock with a more complex combination a plurality of escapement mechanisms with corresponding controller disks may be employed and means may be provided for manipulating these controller disks in such way that they will permit the several escapement mechanisms to operate for different time intervals to thereby control the position at which their corresponding time wheels and controlling tumblers will permit the withdrawal of the bolt. For example, I have illustrated in Fig. 10 a lock employing two unit mechanisms A and B for so controlling the movement of the bolt.

The combination will first be briefly stated and its action on the controlling mechanism subsequently described in detail.

First turn the knob 53 a half revolution in clockwise direction and hold for fifteen seconds, then turn the knob counter-clockwise for a half revolution and hold for thirty seconds, now turn the knob clockwise for three quarters of a revolution to withdraw the bolt.

To return the bolt to a locked position first rotate the knob counter-clockwise a quarter of a revolution and hold until the escapement stops clicking, then turn the knob a half revolution in a counter-clockwise direction which will return the knob and the operative parts of the combination mechanism to their starting positions.

Figure 13:
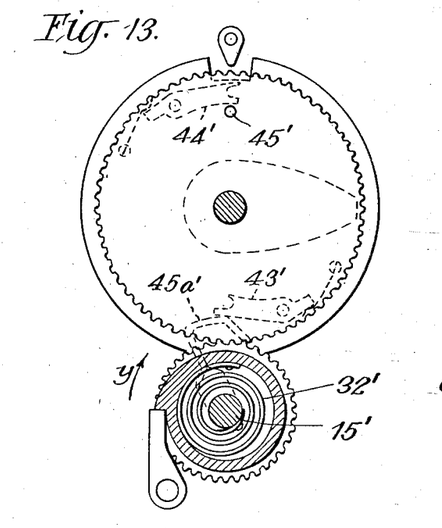
Fig. 13 is a detailed section showing a controller disk and a spring motor, the view being taken on the line 13—13 of Fig. 10.

In this double combination lock the volute spring within the drum 32 of the unit A is arranged as shown in Fig. 5 to rotate the shaft 15 in the direction indicated by the arrow $x$ and a similar spring 32' is arranged as shown in Fig. 13 to turn the shaft 15' of the unit B in the opposite direction as indicated by the arrow $y$, in Figs. 10 and 13. When the knob 53 is turned in a clockwise direction it acts on the winding gear 34 to store energy in the spring motor 31, and when it is turned in a counter-clockwise direction it similarly acts to drive the winding gear 34' to store energy in the spring motor 31'. It is to be noted that because of the yielding connections respectively between the controlling disks 46 and 34 and the similar disks 46' and 34' that the winding of one spring motor 31 may be effected without acting on the motor 31' and vice versa.

Figs. 15 to 22 illustrate diagrammatically the cycle of operation for both of the combination units A and B shown in Fig. 10. Figs. 15 to 18 illustrate different positions of the controller disk for operating the combination unit A shown at the right and controlling the movement of the right tumbler disk 21. Figs. 19 to 22 similarly illustrate the cycle of operation of the combination of the unit B shown at the left of Fig. 10 for controlling the movement of the tumbler disk 21'. These diagrams are delineated on the drawing vertically in line so as to show the corresponding position of the controller disk of each of the units A and B at a given time during the working of the combination. In other words Figs. 15 and 19; 16 and 20; 17 and 21 and 18 and 22 represent the corresponding positions of the controller disks for each of the units A and B at corresponding periods during the working of the combination.

Figure 14:
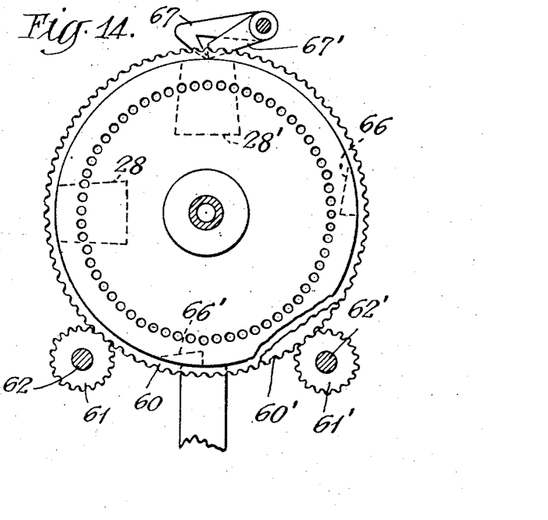
Fig. 14 is a view illustrating the time wheels and means for changing the combination, the view being taken on the line 14—14 of Fig. 10.
Figure 15:
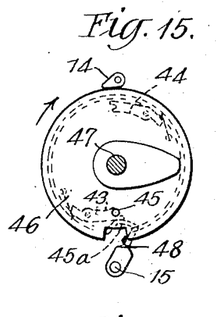
Figs. 15 to 18 inclusive, illustrate somewhat diagrammatically the cycle of operation of one of the combination units shown in Fig. 10.
Figure 16:
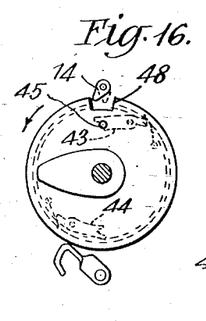
Figure 17:
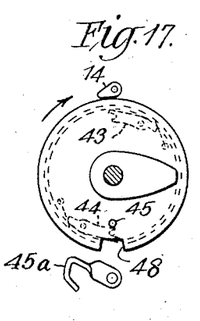
Figure 18:
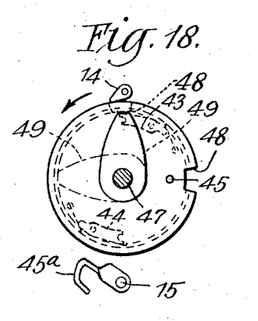

With the notches 28 and 28' located, as shown in Fig. 14, in starting position, the cycle of operation to withdraw the bolt according to the combination above stated will be as follows.

Referring to Figs. 15 to 22 illustrating the working of the double combination lock, the controller disks 46 and 46' are both secured to the controller shaft 47 and therefore move in unison. The knob 53 and disks 46 and 46' are first turned through a half revolution in clockwise direction, which action winds the drum 32 of the combination unit A and turns both of said controller disks 46 and 46' to the positions shown in Figs. 16 and 20. The knob is held in this position for a predetermined interval, in the case illustrated, fifteen seconds, and then turned counter-clockwise for a half revolution which will stop the escapement of the unit A and bring the notch 48' of the disk 46' to position shown in Fig. 21 to permit the escapement of the unit B to operate. The knob will be held in this position for a predetermined interval, thirty seconds in the case shown, to permit the notch 28' in the tumbler disk 21' to come into alinement with the finger 29 of the bolt. A further movement of the knob in counter-clockwise direction of three quarters of a revolution will cause the cams 49 and 49' to move to the positions shown in Figs. 18 and 22 and withdraw the bolt, both the notches 28 and 28' of the tumbler disks 21 and 21' at this time having been alined with the finger 29ª of the bolt. During this last movement the notch 48 will pass the finger 14 so quickly that the escapement will not have sufficient time to run and move the time wheel. To close the bolt and restore the parts to their normal positions, the knob will be turned a quarter of a revolution counter-clockwise which will turn the cams 49 and 49' to the dotted horizontal positions shown in Figs. 18 and 22 and permit the bolt to be thrown to locked position by the springs 51ª and 51ª'.

At this time the notch 48 in the controller disk 46 will be in position to permit the finger 14 of the unit A to vibrate and the knob will be held in such position until the motor runs down (for forty-five seconds in the case illustrated). From this position, the knob will be turned clockwise a half revolution to bring the notch 48' to the vertical position illustrated in Fig. 19 in which the finger 14' is permitted to vibrate and allow the spring motor 31' to run down and thereby restore the time wheel and tumbler disk to starting position. This completes the cycle of operation and puts the lock in condition to be subsequently operated.

Figures 19, 20, 23:
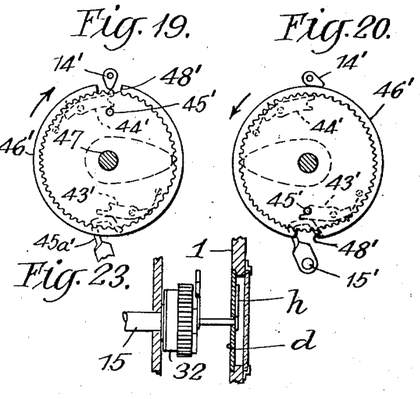
Figs. 19 to 22 inclusive, similarly represent the cycle of operation of the other combination unit shown in Fig. 10.
Figures 21, 22:
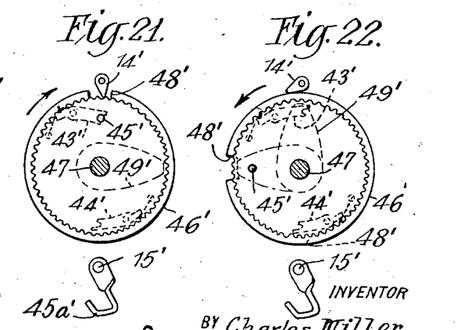

While the lock as thus far described is adapted to be manipulated with a watch or clock at hand, it is clear that if desirable, an indicating hand (h), as shown in Fig. 23, may be provided, this hand being directly driven by the shaft 15 which makes one revolution per minute or through other suitable intermediate gearing as conditions of the design and arrangement of parts may make necessary or desirable. The indicating hand and the graduations g on the dial d over which it moves may be coated with suitable material to make them luminous in the dark so as to enable an operator to readily work the combination at night or in poorly lighted locations.

The lock may be arranged to give visual or audible notice of the intervals and to produce successive impulses or shocks which can be perceived by the operator holding his hand against the lock, and the intervals need not be standard units of time; that is to say, what I have called a "second" may be actually a multiple or a fraction of one second; though it is preferable to use true time intervals which can be checked by one's watch. I use the expression "timing mechanism" and the like to include all of the above variants and all other mechanisms working on the same principle.

While I have described with great particularity in detail the specific embodiments of the invention herein shown, it is not to be construed that my invention is limited thereto. Various modifications, changes and substitutions of equivalents may be made by those skilled in the art without departure from the invention as defined in the following claims.

What I claim is:—

1. In a lock, a bolt, means for moving said bolt, normally idle timing mechanism controlling the movement of said bolt, a winding gear for said timing mechanism, a member movable with said bolt moving means carrying means for driving said winding gear said member being arranged to co-act with the timing mechanism to control the interval of time that said timing mechanism shall run.

2. In a lock, timing mechanism which is normally at rest, a bolt, means for moving said bolt, a manually controlled member movable with said bolt moving means and operatively associated with said timing mechanism for setting the timing mechanism in motion and controlling the interval of time it shall run.

3. In a lock, a bolt, means for moving said bolt, timing mechanism which is normally at rest, including means for preventing the movement of the bolt, a normally unwound spring motor, means for winding said spring motor and means movable in unison with said bolt-moving means operatively associated with said winding means and controlling the length of time that the timing mechanism shall run to permit the movement of the bolt.

4. In a lock, a bolt, timing mechanism including a normally idle motor and a member operatively associated therewith for normally preventing the movement of said bolt, manually controlled means for setting the timing mechanism in motion and a manually operated member for interrupting the motion of said timing mechanism after the lapse of a predetermined time interval to stop said timing mechanism in position to permit the movement of the bolt.

5. In a lock, a bolt, a plurality of timing mechanisms including normally idle motors and members operatively associated with said motors for jointly controlling the movement of said bolt, manually operated members for setting the timing mechanisms in motion and manually operated control members for intermittently interrupting the motion of said timing mechanisms after the lapse of predetermined time intervals to stop said timing mechanisms in position to permit the movement of the bolt.

6. In a lock, a bolt, means for manually moving said bolt, a plurality of normally idle timing mechanisms which jointly control the movement of said bolt, manually operated controlled disks, connections between said controller disks and said timing mechanisms whereby said timing mechanisms can be set in motion and brought to rest, said disks being adapted to be moved intermittently by an operator and held stationary for pre-determined time intervals to control the throwing of the bolt.

7. In a lock, a bolt, normally stationary timing wheels for jointly controlling the movement thereof, normally idle spring motors for driving said time wheels, manually operated members and mechanism operatively associated therewith for winding said spring motors and permitting them to drive said timing mechanisms for pre-determined intermittent time intervals whereby said time wheels are positioned to permit the movement of the bolt.

8. In a lock, a bolt, time wheels having tumblers adjustably secured thereto for jointly controlling the movement of said bolt, spring motors which are normally in a deënergized condition for driving said time wheels, means for winding said spring motors and manually operated disks for controlling the periods of time said motors drive said time wheels.

9. In a lock, a bolt, time wheels for jointly controlling the movement thereof, spring motors which are normally in a deënergized condition for driving said time wheels, gearing including escapement mechanism operatively associated with said spring motors, winding gears for individually energizing said spring motors and manually operated controller disks for interrupting the operation of said escapement mechanisms to stop said time wheels after they have turned into position to permit the bolt to be moved.

10. In a lock, a bolt, a spring motor normally in unwound condition when the bolt is in locked position, a time wheel driven thereby, means for winding said spring motor, gearing including an escapement mechanism associated with said spring motor and said time wheel and a manually operated controller disk for interrupting the operation of said escapment mechanism after the lapse of a predetermined period of time following the winding of said spring motor.

11. In a lock, a bolt, a wheel having a tumbler adjustably secured thereto for controlling the movement of said bolt, a spring capable of turning said wheel and manually operated means whereby the rotary action of the spring upon said wheel may be interrupted after said wheel has turned through a predetermined fraction of a revolution.

12. In a lock, a bolt, wheels having tumblers adjustably secured thereto for jointly controlling the movement of said bolt, individual means for turning said wheels and manually operated means whereby said wheels may be individually stopped after they have turned through predetermined fractions of a revolution.

13. In a lock, a bolt, a normally stationary time wheel for controlling the movement thereof, a spring motor for driving said time wheel, gearing including an escapement mechanism for controlling the movement of said time wheel, a manually operated bolt actuating member and means operatively connected and movable in unison therewith for alternately preventing and permitting the operation of said escapement mechanism.

14. A lock including a bolt, a time wheel for controlling the movement thereof, a bolt actuating member, a spring motor for driving said time wheel, and means operatively associated with the bolt actuating member whereby the movement of said bolt actuating member first stores energy in said spring motor and subsequently permits it to drive said time wheel for a predetermined period to bring it into position to permit the unlocking movement of the bolt.

15. A lock including a bolt, a time wheel for controlling the movement thereof, a spring motor for driving said time wheel, gearing including an escapement mechanism for controlling the movement of said time wheel, a bolt actuating member, a controller disk movable in unison therewith and arranged to coact with said escapement mechanism, a winding gear for said spring motor and means carried thereby and coacting with said controller disk so that a turning movement in one direction of said controller disk will wind said motor while the movement in the opposite direction will be ineffective thereon.

16. A lock including a bolt, a time wheel for controlling the movement of said bolt, a spring motor for driving said time wheel, means for winding said spring motor and means for limiting the winding movement of said spring motor and the turning movement of said time wheel to a fixed angular distance.

17. A lock including a bolt, a time wheel for controlling the movement of said bolt, a spring motor for driving said time wheel, means for winding said spring motor and means for limiting the winding movement of said spring motor and the turning movement of said time wheel to exactly one revolution.

18. A lock including a bolt, a time wheel for controlling the movement of said bolt, a spring motor for driving said time wheel, an escapement mechanism for controlling the rotary movement of said time wheel, a bolt actuating member, a spring motor associated with said time wheel, an escapement mechanism and a controller disk co-acting with said escapement mechanism and movable with said bolt actuating member, a winding gear for said spring motor and yielding means for establishing a driving connection between said disk and said winding gear when the disk is moved in one direction and permitting the disk to move independently when it is moved in the opposite direction.

19. A lock including a bolt, a time wheel for controlling the movement of said bolt, a bolt actuating member, a controller disk connected thereto, a spring motor for driving said time wheel, a gear for winding said spring motor and pawls carried by said winding gear and co-acting with said controller disk whereby the movement of said controller disk will first wind said spring motor and subsequently permit it to drive said time wheel.

20. A lock including a bolt, a time wheel for controlling the movement of said bolt, a bolt actuating member, a yoke carried by said bolt and coacting with the bolt actuating member for preventing said bolt-actuating member from turning more than a half revolution when said time wheel is in locked position, a spring motor for driving said time wheel and means whereby the movement of one half revolution of said bolt actuating member will wind said spring motor.

21. A lock including a bolt, a time wheel for controlling the movement of said bolt, a normally unwound spring motor, a bolt moving member arranged to move through a half revolution without moving said bolt, a controller disk and a winding gear operatively associated with said bolt moving member to store sufficient energy in said spring motor to rotate said time wheel one complete revolution.

22. A lock including a bolt, means for controlling the movement of said bolt comprising time wheels having tumblers rotatably secured thereto, impositive locks for holding said tumblers in their respective adjusted positions and means for individually moving said tumblers relatively to said time wheels.

23. A lock including an operating shaft, means for turning said shaft, means for indexing the movement of said shaft, a bolt, a bolt actuating member and a control disk movable in unison with said shaft, a winding gear loose on said shaft, means whereby a movement in only one direction of said shaft will turn said winding gear, a spring motor arranged to be wound by said gear and a time wheel driven by said motor for a period governed by said control disk, substantially as and for the purpose set forth.

24. A lock including a bolt, a normally stationary time wheel for preventing the movement of said bolt, a normally unwound spring motor for driving said time wheel and mechanism for winding said spring motor and controlling the interval of time that it drives said time wheel to bring it into position to permit the movement of said bolt.

25. A lock including a bolt, normally stationary time wheels having tumblers secured thereto for preventing the movement of said bolt and means for individually moving said time wheels for predetermined intervals of time to bring them to positions to permit the movement of said bolt.

In witness whereof, I have hereunto signed my name.

CHARLES MILLER.